United States Patent
Khambete

(10) Patent No.: US 7,290,300 B1
(45) Date of Patent: Nov. 6, 2007

(54) POLYESTER FIBER CUSHION APPLICATIONS

(75) Inventor: Surendra Khambete, West Bloomfield, MI (US)

(73) Assignee: IndraTech, LLC, Auburn Hills, MI (US)

( * ) Notice: Subject to any disclaimer, the term of this patent is extended or adjusted under 35 U.S.C. 154(b) by 0 days.

(21) Appl. No.: 11/261,855

(22) Filed: Oct. 28, 2005

Related U.S. Application Data

(60) Provisional application No. 60/522,691, filed on Oct. 28, 2004.

(51) Int. Cl.
*A47C 7/72* (2006.01)

(52) U.S. Cl. ............ 5/423; 5/726; 5/652.1; 297/180.13

(58) Field of Classification Search ........ 5/724, 5/726, 423, 652.1, 652.2, 952; 297/180.1, 297/180.13
See application file for complete search history.

(56) References Cited

U.S. PATENT DOCUMENTS

| | | | | |
|---|---|---|---|---|
| 3,616,470 A | * | 11/1971 | Young et al. | 5/638 |
| 4,136,413 A | * | 1/1979 | Scales | 5/423 |
| 4,486,493 A | * | 12/1984 | Burmester et al. | 442/308 |
| 4,668,562 A | * | 5/1987 | Street | 428/218 |
| 4,946,220 A | * | 8/1990 | Wyon et al. | 297/180.13 |
| 5,591,289 A | | 1/1997 | Souders et al. | |
| 5,660,908 A | | 8/1997 | Kelman et al. | |
| 5,679,296 A | | 10/1997 | Kelman et al. | |
| 5,688,467 A | | 11/1997 | Kelman et al. | |
| 5,733,631 A | | 3/1998 | Kelman | |
| 5,787,534 A | * | 8/1998 | Hargest et al. | 5/726 |
| 5,826,288 A | * | 10/1998 | Ecer | 5/724 |
| 6,131,220 A | * | 10/2000 | Morimura | 5/652.1 |
| 6,263,530 B1 | * | 7/2001 | Feher | 5/423 |
| 6,848,742 B1 | | 2/2005 | Aoki et al. | |
| 6,857,697 B2 | | 2/2005 | Brennan et al. | |
| 6,893,086 B2 | | 5/2005 | Bajic et al. | |
| 2005/0011009 A1 | * | 1/2005 | Wu | 5/726 |
| 2005/0023080 A1 | | 2/2005 | Tompson et al. | |

FOREIGN PATENT DOCUMENTS

EP 0606184 1/1994

OTHER PUBLICATIONS

Sketch of "IFP Process by Hermann".
Undated Sketch.
Sketch dated Jul. 16, 2004.

* cited by examiner

*Primary Examiner*—Michael Trettel
(74) *Attorney, Agent, or Firm*—Carlson, Gaskey & Olds

(57) ABSTRACT

A non-woven, randomly oriented polyester fiber cushion is provided with conditioned air to regulate a temperature of the cushion assembly. The overlapping fibers form interstices through which the air is blown. The air flows through the fibers in a tortuous path.

12 Claims, 1 Drawing Sheet

POLYESTER FIBER CUSHION APPLICATIONS

This application claims priority to provisional application No. 60/522,691 filed on Oct. 28, 2004.

BACKGROUND OF THE INVENTION

This invention relates to polyester cushions for various applications.

It is desirable in modern vehicles to control the temperature of the seat to increase the comfort to the vehicle occupant. For example, truckers can spend a significant amount of time seated in the vehicle during lengthy cross-country trips. As a result, seating comfort is especially important for truckers. Typically, vehicle HVAC systems may not adequately cool the interface between the driver and the seat.

For heating, resistive heating elements have been arranged between seat bottom foam cushions and seat coverings to heat a vehicle seat. However, it may not be desirable to use electrical heating elements for various reasons and they cannot cool the seat.

Vehicle seats typically use polyurethane foam cushions as the primary support for the occupant. The structure of the foam does not permit air to flow through the foam. Recently, some manufacturers have formed holes in the foam cushion so that conditioned air can be blown through the holes. However, providing the holes, and any other passageways, can add cost and complexity to manufacturing the cushion. Furthermore, polyurethane cushions have undesirable flammability and recyclability properties.

What is needed is a system that regulates the temperature of a cushion by providing conditioned air, for example, in a seat.

SUMMARY OF THE INVENTION

The invention uses a non-woven, randomly oriented polyester fiber cushion that is provided with conditioned air to regulate a temperature of the cushion assembly. The overlapping fibers form interstices through which the air is blown. The air flows through the fibers in a tortuous path. As a result, the holes and other formed passageways in the prior art are not required. Further, a more uniform regulation of cushion assembly temperature is possible.

These and other features of the present invention can be best understood from the following specification and drawings, the following of which is a brief description.

DETAILED DESCRIPTION OF THE PREFERRED EMBODIMENT

Figure 1:
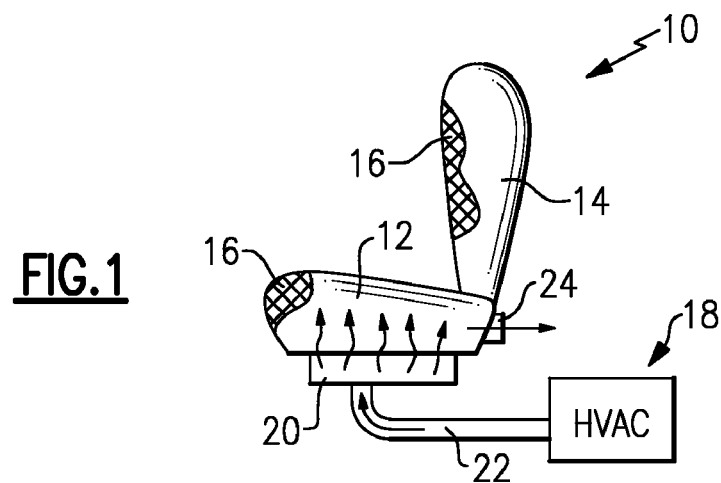
FIG. 1 is a schematic view of an inventive seating arrangement using a fiber cushion.

A seat assembly 10 is schematically shown in FIG. 1. It should be understood that the seat assembly 10 may be used in any industry, for example, the aircraft, marine, furniture, automotive and medical industries. Moreover, the invention can be used in applications other that seats. For example, the invention can be used to regulate the temperature of a mattress, for example, in a baby crib where electric heating blankets are not desired. The invention may also be used, for example, in medical tables to heat the table prior to use by a patient.

Returning to FIG. 1, the seat assembly 10 includes a seat bottom 12 and a seat back 14. The seat bottom 12 and seat back 14 include a fiber cushion 16 that may be constructed from polyester fibers. The fiber cushion will be described in more detail below.

A conditioned fluid system such as an HVAC system 18 is connected to the seat 10. A vehicle air conditioning system for automotive applications or a home heating and cooling system for home furniture applications can provide the HVAC system, for example. In the example, a vent 20 is arranged in close proximity to, for example, the bottom 12 to provide cold air from ducting 22. In a similar manner, warm air may be provided to the cushion 16.

The polyester fibers are arranged to provide an open structure that permits airflow through the fiber cushion 16. Cool air flows through the fiber cushion 16 to cool the seat 10 and then exits an outlet 24, for example. The outlet 24 may simply be an opening in the seat covering. The illustrated flow path through the seat 10 and cushion 16 is only exemplary.

Figure 2:
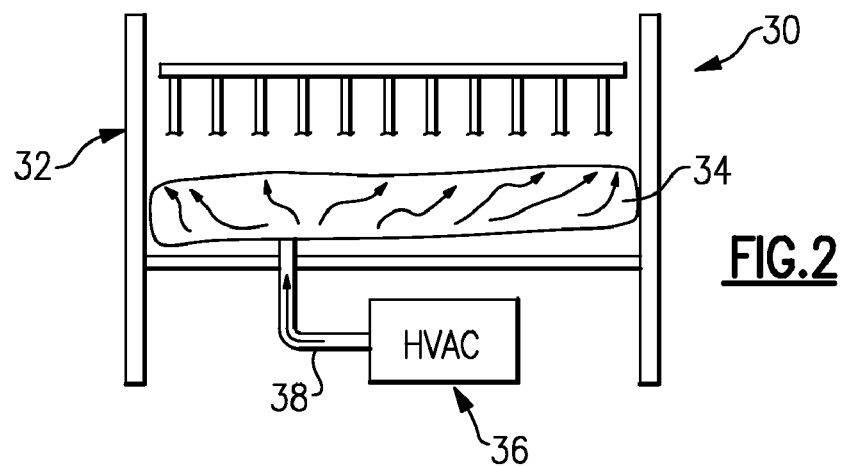
FIG. 2 is a schematic view of an inventive fiber mattress and conditioned air system.

In another example, a fiber cushion mattress 34 can be heated or cooled by a conditioned fluid system 36, shown in FIG. 2. The mattress 34 is shown supported on a frame 32 of a baby crib 30 in the example. Conditioned air is provided to a bottom side of the mattress 34 by ducting 38. In this manner, the mattress 34 can be locally heated or cooled to provide comfort to the user, for example, where whole-house HVAC systems are not available.

Figures 3, 4:
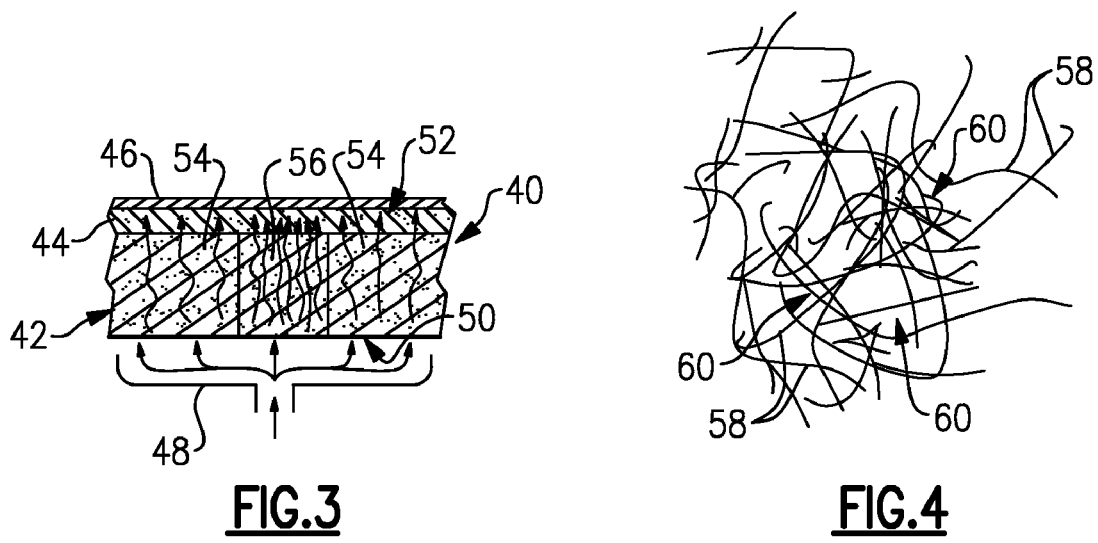
FIG. 3 is a cross-section through one example cushion assembly.
FIG. 4 is an enlarged view of non-woven, randomly oriented polyester fibers in the cushion assembly of FIG. 3.

Referring to FIG. 3, a cushion assembly 40 includes multiple layers. A first layer 42 is constructed from dense non-woven, randomly oriented polyester fibers. The first layer 42 serves primarily to support the weight of the user instead of the typical polyurethane foam. A second layer 44, which may be a soft-touch layer, is arranged adjacent to or near the first layer 42. The second layer 44 is constructed from less dense non-woven, randomly oriented polyester fibers to provided a desired feel to the user. An aesthetic layer 46, such as fabric or leather, is arranged over the fiber first and second layers 42 and 44 to provide an aesthetic exterior surface. The density can also be varied laterally, in addition to or instead of top to bottom, by providing first and second portions 54 and 56 having different densities. The conditioned air passes more easily through the portion that is less dense.

A vent 48 is shown schematically in fluid communication with the fiber first and second layers 42 and 44. In the example, the vent 48 provides conditioned air to a bottom surface at a first side 50 of the first layer 42. The conditioned air flows through the first and second layers 42 and 44 from the first side 50 to a second side 52 that supports the aesthetic layer 46.

The fiber cushion can be formed using any suitable process. For example, loose polyester fibers are blown into a mold, heated to a desired temperature and compressed in the mold to form the desired cushion shape. Polyester fibers manufactured in this manner have an open structure unlike foam, which has a very dense, closed structure. Referring to FIG. 4, the fibers 58 are non-woven and randomly oriented to form interstices 60. The interstices 60 enable air to pass through the cushion in a tortuous path.

The use of polyester fibers provides a completely recyclable end product, unlike polyurethane. The polyester is selected to have desirable acoustic and flammability properties for the application in which the end product is used.

Although a preferred embodiment of this invention has been disclosed, a worker of ordinary skill in this art would recognize that certain modifications would come within the scope of this invention. For that reason, the following claims should be studied to determine the true scope and content of this invention.

The invention claimed is:

1. An air-conditioned cushion assembly comprising:
   a cushion having a first layer comprising non-woven, randomly oriented polyester fibers;
   a conditioned fluid system in communication with the first layer for regulating a temperature of the assembly; and
   a second layer arranged adjacent to the first layer, the second layer comprising non-woven, randomly oriented fibers, the conditioned fluid system in communication with the second layer.

2. The assembly according to claim 1, wherein a third layer is arranged adjacent to the first layer, the third layer providing an aesthetic exterior surface to the assembly.

3. The assembly according to claim 1, wherein a fluid from the conditioned fluid system flows through the fibers.

4. The assembly according to claim 3, wherein the fluid takes a tortuous path through the fibers.

5. The assembly according to claim 3, wherein the fibers overlap to form interstices, and the fluid flowing through the interstices.

6. The assembly according to claim 3, wherein the first layer includes first and second opposing sides, the fluid flowing through the fibers from the first side to the second side.

7. The assembly according to claim 6, wherein the first and second sides respectively include first and second surfaces, the conditioned fluid system having a vent delivering the fluid to the first surface with the fluid flowing through the fibers to the second surface.

8. The assembly according to claim 7, wherein the surfaces are generally planar.

9. The assembly according to claim 8, wherein the surfaces are generally coplanar.

10. The assembly according to claim 7, wherein first side is a bottom side and the second surface is a top side.

11. The assembly according to claim 10, wherein an aesthetic exterior layer is adjacent to the top side.

12. An air-conditioned cushion assembly comprising:
    a cushion having a first layer comprising non-woven, randomly oriented fibers;
    a conditioned fluid system in communication with the first layer for regulating a temperature of the assembly; and
    a second layer and arranged adjacent to the first layer, the second layer comprising non-woven, randomly oriented fibers, the conditioned fluid system in communication with the second layer, wherein the first and second layers having densities that are different than one another.

* * * * *